United States Patent Office 2,788,341
Patented Apr. 9, 1957

2,788,341

PROCESS FOR THE MANUFACTURE OF AMINOACYL COMPOUNDS

Robert Schwyzer, Riehen, Switzerland, assignor to Ciba Pharmaceutical Products, Inc., Summit, N. J.

No Drawing. Application November 12, 1953,
Serial No. 391,739

Claims priority, application Switzerland March 6, 1953

10 Claims. (Cl. 260—112)

This invention relates to the manufacture of aminoacyl compounds and more particularly to a new process for the aminoacylation of compounds containing active hydrogen, as for example, amines or alcohols.

The introduction of aminoacyl radicals into amino carboxylic acids and esters thereof by reacting them with acylaminocarbothiolic acids and their phenyl esters is known (M. W. Cronyn, J. Jiu, Journal of the Americal Chemical Society, 74, 4726 [1952]; J. C. Sheehan and D. A. Johnson, Journal of the American Chemical Society, 74, 4726 [1952]; Th. Wieland and co-workers, Liebigs Annalen der Chemie, 573, 99 [1951]; 576, 104 [1952]; Zietschrift für angewandte Chemie, 63, 146 [1951]). However, the procedure involves a number of drawbacks. For one thing, the acylaminocarbothiolic acids are relatively difficult to prepare and are of low stability. Their phenyl esters are sparingly soluble in water, so that the reaction has to be carried out in an organic solvent. This circumstance works as a handicap in the acylation of amino acids, peptides, and proteins, which are difficultly soluble in organic solvents. Moreover, the yields obtained are unsatisfactory.

The present invention now provides an advantageous process of aminoacylation by reacting compounds containing active hydrogen with S-aminoacylmercaptans of the formula

A—X—CO—S—Y—Z containing electrophilic substituents, or salts thereof. In this formula, A represents an amino group which may be free or substituted, e. g. by acyl, acylaminoacyl, aminoacyl aminoacyl, alkyl, alkylene, cycloalkyl, aryl, aralkyl, and/or heterocyclic radicals, for instance the acetyl-, aminoacetyl-, aminoacetylaminoacetyl-, carbobenzoxy-amino acetyl-, carbobenzoxyaminoacetylamino-acetyl-, benzoyl-, phthaloyl-, nitrophenoxyacetyl-, carbobenzoxy-, thiocarbobenzoxy-, dimethyl- or diethylamino or piperidino or morpholino group. X and Y stand for any organic members which may form isocyclic or heterocyclic rings, in particular members wherein A is separated from CO, or S from Z, by 1 to 4 carbon atoms, such as the methylene, ethylene, propylene or phenylene group. A—X—CO preferably represents the radical of a natural amino acid, such as an aminoacetyl or amino-propionyl radical. Z stands for an electrophilic substituent, especially for the carboxyl group, and also for the sulfo, the nitro or an acylamino group or a free, etherified or esterified hydroxyl group or for a halogen atom.

The said S-aminoacylmercapto compounds are new. They can be prepared by the process described in Application Ser. No. 391,738, filed November 12, 1953. In general the process comprises reacting a compound of the formula A—X—B₁ with a compound of the formula B₂—Y—Z wherein B₁ and B₂ represent substituents which react to form the grouping —CO—S— linking X and Y; and A, X, Y and Z, have the aforementioned significance.

For the reaction with the acylaminomercaptans and their salts, any desired compound containing active hydrogen can be used, e. g. such as contain a hydroxyl or amino group, for instance aliphatic, alicyclic, aromatic, araliphatic or heterocyclic amines or alcohols, in particular natural or synthetic aminocarboxylic acids, peptides or proteins.

The process is carried out either without any solvent or preferably in the presence of water, or other solvents, such as alcohols, dimethyl formamide or mixtures thereof. Concentrations are advantageously 1 mol or more of each of the reactants. It is possible to employ mild conditions, which is of considerable importance in the synthesis of relatively complicated peptides. The present process gives good yields, especially when it is carried out at a pH above 3.

The following examples illustrate the invention, the parts being by weight unless otherwise stated, and the relationship of parts by weight to parts by volume being the same as that of the gram to the cubic centimeter:

Example 1

0.25 part of S-(benzoylamino-acetyl)-mercaptoacetic acid (prepared according to Example 1 in application Ser. No. 391,738, filed November 12, 1953, is dissolved in 2 parts by volume of dimethyl formamide and mixed with 4 parts by volume of a citrate- phosphate-borate buffer of the desired pH (according to T. Theorell and E. Stenhagen, Biochemische Zeitschrift, 299, 416 [1938]). After an addition of 0.09 part of aniline, the solution is given the desired pH by means of caustic soda solution or hydrochloric acid. Finally, water is added to make up 12 parts by volume, in other words, to bring the concentration of the reactants to about 0.083 mol. The mixture is allowed to stand at 35° C. for 24 hours at the end of which period the benzoylaminoacetanilide formed has separated in pure form. It melts at 217° C. the crystals are filtered and weighed.

The following yields are obtained with the application of the stated pH values:

| pH: | percent |
|---|---|
| 2 | 14.5 |
| 4 | 66 |
| 6 | 43 |
| 7 | 37 |
| 8 | 21 |
| 9 | 16.5 |

The reaction can be illustrated by the following equation:

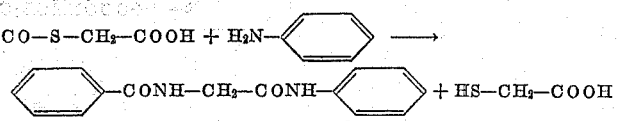

Example 2

0.25 part of S-(benzoylamino-acetyl)-merapto-acetic acid are reacted in the manner described in Example 1 with 0.11 part of benzylamine according to the equation

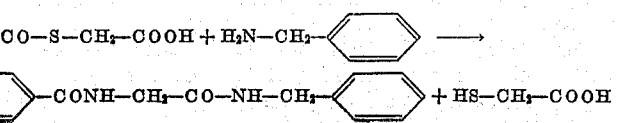

The yield of benzoylaminoacetic acid benzylamide (melting at 164° C.) is 43 percent at pH 8 or 73 percent at pH 9.

Example 3

0.25 part of S-(benzoylamino-acetyl)-mercapto-acetic acid and 0.075 part of aminoacetic acid are mixed with 1 part by volume of 2 N-caustic soda solution, and the solution kept at 35° C. for 15 hours. After the addition of 1 part by volume of 2 N-hydrochloric acid, the reaction mass is evaporated to dryness and unchanged S-(benzoylamino-acetyl)-mercapto-acetic acid, and also benzoylamino-acetic acid (formed by hydrolysis), dissolved in absolute alcohol. The insoluble residue is washed with alcohol and recrystallized from water.

There is thus obtained 0.11 part of N-benzoylamino-acetyl-aminoacetic acid of melting point 206° C., that is to say a yield of 46 percent, according to the reaction represented by the equation:

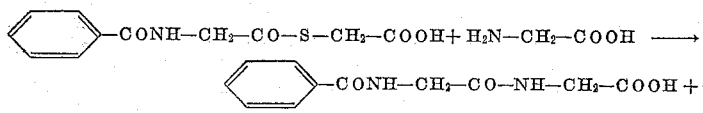

Example 4

0.28 part of S-(carbobenzoxyamino-acetyl)-mercapto-acetic acid (prepared according to Example 1 in application Ser. No. 391,738, filed November 12, 1953) and 0.075 part of aminoacetic acid are mixed with 1 part by volume of 2 N-caustic soda solution and the solution kept at 35° C. for 15 hours. After the addition of 1 part by volume of 2 N-hydrochloric acid, the reaction mass is evaporated to dryness and unchanged S-(carbobenzoxy-amino-acetyl)-mercaptoacetic acid, and also carbobenzoxyamino-acetic acid, removed by means of alcohol.

Thus, by the reaction according to the equation

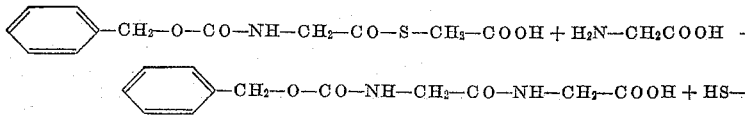

there is obtained N-carbobenzoxyaminoacetyl-aminoacetic acid which, after crystallization from 2 parts by volume of water, melts at 178° C. The yield is 0.19 part or 70 percent of the calculated yield.

Example 5

0.28 part of S-(carbobenzoxyamino-acetyl)-mercapto-acetic acid and 0.075 part of aminoacetic acid are heated with 0.5 part by volume of 4 N-caustic soda solution for one hour at 80–85° C. After cooling, the mixture is acidified with concentrated hydrochloric acid and cooled in ice. The precipitated crystals are separated from the mother liquor, washed with cold water and dried. After drying, soluble compounds are dissolved out with absolute alcohol and the residue recrystallized from water. Yield: 0.180 part of N-carbobenzoxyamino-acetyl-aminoacetic acid melting at 178° C., corresponding to 67% of the calculated yield.

Example 6

0.34 part of S-(carbobenzoxyamino-acetyl)-thiosalicylic acid (prepared according to Example 2 in application Ser. No. 391,738, filed November 12, 1953) and 0.075 part of amino-acetic acid are reacted at 80–85° C. exactly as described in Example 5 for the corresponding mercaptoacetic acid derivative. After working up in the same way, there is a yield of 0.130 part (=49%) of N-carbobenzoxyaminoacetyl-aminoacetic acid.

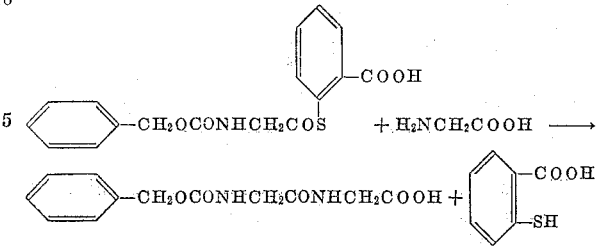

Example 7

0.96 part of N-aminoacetyl-aminoacetic acid (glycyl-glycin) and 2.5 parts of S-(carbobenzoxyaminoacetyl)-mercaptoacetic acid are mixed and 4.0 parts by volume of 4 N-caustic soda solution are added. After keeping the solution for 20 hours at 35° C. the pH value of 6.5 is corrected again to 8.5 with 4 N-caustic soda solution. After a further 5 hours at 35° C. the whole is acidified with concentrated hydrochloric acid to pH=2 and working up continued as described in Example 5. There is a yield of 1.8 parts or 79% of N-[N-(carbobenzoxy-amino - acetyl) - amino - acetyl] - aminoacetic acid (carbobenzoxydiglycyl-glycin) melting at 204° C.

C₆H₅—CH₂OCONHCH₂COSCH₂COOH + H₂NCH₂CONHCH₂COOH ⟶

C₆H₅—CH₂OCONHCH₂CONHCH₂CONHCH₂COOH + HSCH₂COOH

Example 8

0.34 part of S - (carbobenzoxyamino - acetyl) - thiosalicylic acid and 0.13 part of N-aminoacetyl-aminoacetic acid are reacted in an analogous manner to that described in Example 6. There is obtained 52% of the calculated yield of N-[N-(carbobenzoxy-amino-acetyl)-aminoacetyl]-amino-acetic acid.

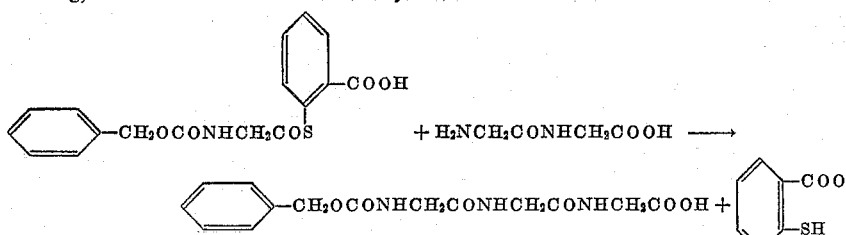

Example 9

1.0 part of DL-alanyl-glycin and 2.3 parts of S-(carbobenzoxyamino - acetyl) - mercapto - acetic acid are mixed and 3.75 parts by volume of 4 N-caustic soda solution are added. The solution is kept for 24 hours at 35° C. and then acidified with 8.5 parts by volume of 2 N-hydrochloric acid and then saturated with sodium chloride. The oily reaction product is extracted with ethyl acetate and crystallized with a mixture of ethyl acetate and ether. Yield: 1.68 parts=73% of carbobenzoxy-amino-acetyl-DL-alanyl-glycin melting at 150° C. Recrystallization from water does not change the properties. After drying at 10⁻³ pressure of mercury the compound is analytically pure.

promoter) and kept at 35° C. for 17 hours. The solution is given a pH of 7 by means of dilute caustic soda solution, and the reaction product is then filtered off and recrystallized from water. It melts at 251–253° C. According to the analysis the substance is N-(benzoylamino-acetyl)-N'-isonicotinyl-hydrazine.

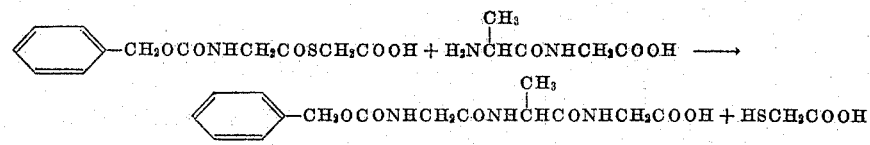

Example 10

0.2 part of D:L-methionine and 0.4 part of S-(carbobenzoxyamino -acetyl) - mercaptoacetic acid are mixed and 0.7 part by volume of 4 N-caustic soda solution is added. After keeping the solution for 20 hours at 35° C. the whole is acidified with 1.5 parts by volume of 2 N-hydrochloric acid and extracted with ethyl acetate.

The following yields are obtained:

| pH: | Approx. percent |
|---|---|
| 2 | 67 |
| 3 | 100 |
| 4 | 91 |
| 5 | 67 |
| 6 | 45 |

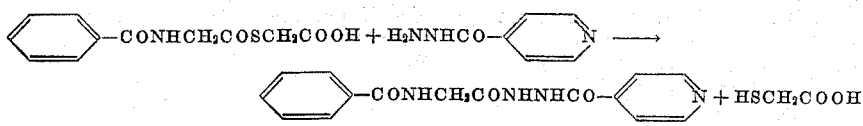

From the purified and dried extracts of ethyl acetate there can be obtained by concentration and addition of petroleum ether 0.22 part (60%) of N-(carbobenzoxyamino-acetyl)-D:L-methionine melting at 123° C.

Example 13

1.2 parts of S-(carbobenzoxyamino-acetyl)-mercapto-acetic acid are dissolved in 10 parts by volume of water and 5 parts by volume of 1 N-caustic soda solution and

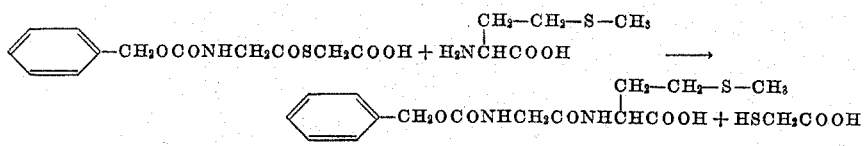

Example 11

0.31 part of S - (benzoylamino - acetyl) - thiosalicylic acid and 0.075 part of amino-acetic acid reacted in the same manner as described in Example 6 yield 0.19 part of N-(benzoylamino-acetyl)-aminoacetic acid (hippuryl- 0.13 part by volume of ethylene-diamine is added. Crystallization occurs immediately. After 4 hours at a temperature of 35° C. the crystallizate is filtered with suction and washed with sodium carbonate solution, dilute hydrochloric acid and with water. Recrystallization is effected from absolute alcohol. Melting point=212–213° C. According to the analysis the substance is N:N'-di-(carbobenzoxyaminoacetyl)-ethylene-diamine. The yield is 57%.

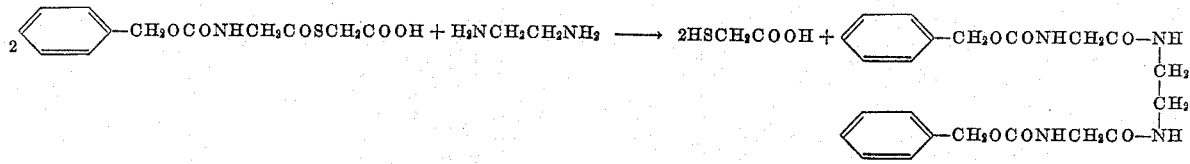

glycin), i. e. in a yield of 80%.

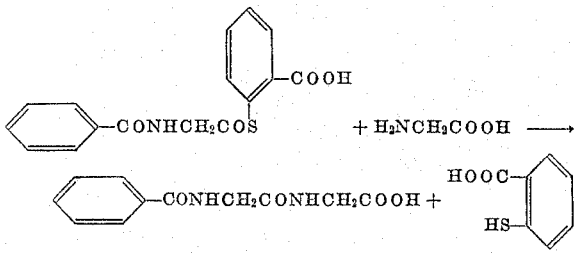

Example 12

0.28 part of S-(benzoylamino-acetyl)-mercapto-acetic acid and 0.15 part of isonicotinic acid hydrazide are each dissolved in 20 parts by volume of acetate buffer of the desired pH (adding a little dimethylformamide as solution Instead of the amines mentioned in the above examples the following reactants may be used: serine, cystine, aminobutyric acid, valine, leucine, phenylalanine, tyrosine, tryptophan, histidine, γ-carbobenzoxy-ornithine, asparagine, asparaginic acid, glutaminic acid, proline, diglycine, methionyl-glycine and glutathione. Furthermore there may also be used other S-aminoacyl-mercaptan compounds such as for example S-(phthalylamino-acetyl)-mercaptoacetic acid, S-(benzoylamino-acetyl)-β-mercaptopropionic acid, S-aminoacetyl-mercapto-acetic acid, S - [N - (N - carbobenzoxyaminoacetyl - aminoacetyl) - aminoacetyl]-mercaptoacetic acid or S-[N-(N-aminoacetyl - aminoacetyl) - aminoacetyl] - mercaptoacetic acid, which are prepared according to the examples in application Ser. No. 391,738, filed November 12, 1953,

What is claimed is:

1. A process for aminoacylation, which comprises reacting a member selected from the group consisting of amines containing at least one hydrogen at the nitrogen atom and alcohols, with amino-thiolcarboxylic acid esters of the formula:

$$A\text{---}X\text{---}CO\text{---}S\text{---}Y\text{---}Z$$

wherein A represents an amino group, X stands for the divalent radical linking the amino and carboxyl group of a natural amino acid, Y stands for a member selected from the group consisting of lower alkylene and phenylene radicals and Z stands for the carboxyl group, said reaction being conducted in an aqueous medium.

2. A process in accordance with claim 1 wherein metal salts of the S-aminoacylmercaptans are employed.

3. A process in accordance with claim 1, wherein compounds of the formula are employed in which A stands for an acylamino group.

4. A process in accordance with claim 1, wherein compounds of the formula are employed in which A stands for a free amino group.

5. A process in accordance with claim 1, wherein compounds of the formula are employed in which X and Y are members which separate A from CO and S from Z by 1 to 4 carbon atoms.

6. Process according to claim 1, wherein S-(benzoylamino-acetyl)-mercaptoacetic acid is used as starting material.

7. Process according to claim 1, wherein S-(carbobenzoxyamino-acetyl)-mercaptoacetic acid is used as starting material.

8. Process according to claim 1, wherein S-(carbobenzoxyamino-acetyl)-thiosalicylic acid is used as starting material.

9. Process according to claim 1, wherein S-(benzoylamino-acetyl)-thiosalicylic acid is used as starting material.

10. A process in accordance with claim 1, wherein the reaction is carried out at a pH from about 3 to about 9 inclusive.

References Cited in the file of this patent

UNITED STATES PATENTS 2,709,164    Wieland ---------------- May 24, 1955